US008366576B2

(12) United States Patent
Neutz et al.

(10) Patent No.: US 8,366,576 B2
(45) Date of Patent: Feb. 5, 2013

(54) TOOTHED CHAIN, IN PARTICULAR FOR A VEHICLE DRIVE

(75) Inventors: Matthias Neutz, Karlsruhe (DE); Olga Ispolatova, Buehlertal (DE); Marcus Junig, Emmenbruecke (CH); Stephan Penner, Buehl (DE); Anton Simonov, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/084,075

(22) Filed: Apr. 11, 2011

(65) Prior Publication Data

US 2011/0269590 A1 Nov. 3, 2011

Related U.S. Application Data

(63) Continuation of application No. PCT/DE2009/001345, filed on Sep. 24, 2009.

(60) Provisional application No. 61/197,236, filed on Oct. 25, 2008.

(51) Int. Cl.
  *F16G 13/02* (2006.01)
  *F16G 13/04* (2006.01)
(52) U.S. Cl. .................. 474/213; 206/215
(58) Field of Classification Search .............. 474/201, 474/212–215, 231
  See application file for complete search history.

(56) References Cited

U.S. PATENT DOCUMENTS

| 342,567 | A | * | 5/1886 | Bernhardt | 474/212 |
|---|---|---|---|---|---|
| 1,727,129 | A | * | 9/1929 | Morse | 474/213 |
| 2,154,648 | A | * | 4/1939 | Weston | 474/201 |
| 3,359,815 | A | * | 12/1967 | Mueller et al. | 474/231 |
| 4,504,255 | A | * | 3/1985 | Rattunde | 474/201 |
| 5,176,586 | A | * | 1/1993 | Sugimoto | 474/212 |
| 5,345,753 | A | * | 9/1994 | Okuda et al. | 59/5 |
| 5,758,484 | A | * | 6/1998 | Ledvina et al. | 59/5 |
| 6,171,209 | B1 | * | 1/2001 | Matsuda | 474/213 |
| 6,494,800 | B1 | * | 12/2002 | Kanehira et al. | 474/215 |
| 6,695,731 | B2 | * | 2/2004 | Linnenbrugger et al. | 474/215 |
| 2001/0023213 | A1 | * | 9/2001 | Horie et al. | 474/213 |
| 2001/0046917 | A1 | * | 11/2001 | Linnenbrugger et al. | 474/215 |

FOREIGN PATENT DOCUMENTS

EP 1 201 962 A1 5/2002

* cited by examiner

*Primary Examiner* — Michael Mansen
*Assistant Examiner* — Henry Liu
(74) *Attorney, Agent, or Firm* — Lucas & Mercanti, LLP; Klaus P. Stoffel

(57) ABSTRACT

A toothed chain, which has a multiplicity of toothed links and cover links articulatedly connected to one another by cradle pieces. The cradle pieces are arranged in cradle piece openings of the toothed links and cover links. The cover links form guide links situated at the outside at both sides of a longitudinal direction and hold the toothed links between them. The cover links are formed with link yokes, which have a respective opening for the cradle pieces, and with an upper and lower link web which connect the link yokes. An opening is formed in the region between the upper and lower link webs, which has, in plan view, a substantially trapezoidal shape with sides of substantially equal lengths and an upper side and lower side of different lengths. The upper side is assigned to the upper link web and the lower side to the lower link web.

14 Claims, 4 Drawing Sheets

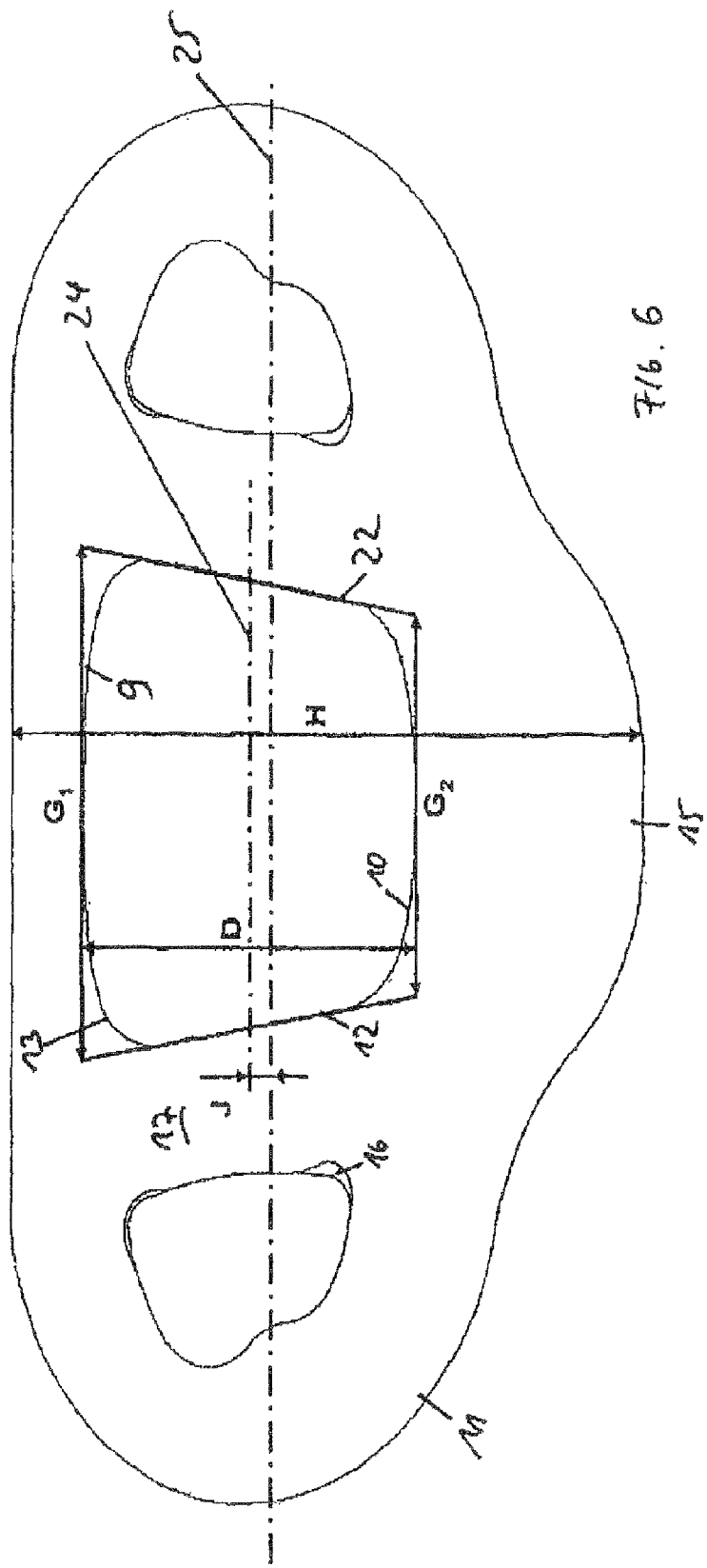

TOOTHED CHAIN, IN PARTICULAR FOR A VEHICLE DRIVE

This application is a continuation of PCT/DE2009/001345 filed Sep. 24, 2009, which in turn claims the priority of U.S. Provisional Patent Application No. 61/197,236 filed Oct. 25, 2008, the priority of both applications is hereby claimed and both applications are incorporated by reference herein.

FIELD OF THE INVENTION

The present invention relates to a toothed chain, in particular for a vehicle drive, having a multiplicity of toothed link plates and cover link plates articulatedly connected to one another by cradle pieces.

Such toothed chains may be used for example in transfer gearboxes or very generally in gearboxes in which shaft distances must be overcome.

BACKGROUND OF THE INVENTION

In such toothed chains, use is made of different link plate types, since the toothed chain must be guided transversely with respect to its direction of circulation. For this purpose, the chain has integrated into it so-called guide link plates or cover link plates which, in the case of externally-guided toothed chains, are provided with a run-in web which projects laterally beyond the sprocket which interacts with the toothed chain.

With such guide link plates, it must be ensured that the rigidity of the guide link plate does not differ significantly from the rigidity of the toothed link plates situated at the inside. Specifically, if there is a significant difference here, then the guide link plates or cover link plates absorb higher tensile stresses and therefore cause higher stresses at the stress-critical regions, specifically in the contact region between the cover link plate and the cradle pieces pressed into the cradle piece openings, such that there is the risk of crack formation proceeding from these then overloaded regions. To eliminate said problem, known guide link plates have an opening in the region between the upper and lower link plate webs. Said opening serves to reduce the rigidity of the cover link plate.

For said guide link plates, a plurality of embodiments has already been disclosed in the prior art. For example, U.S. Pat. No. 5,345,753 has disclosed a guide link plate which, in the region between the upper and lower link plate webs, has an opening composed of a plurality of interconnected convex or concave curve segments. In said known cover link plate, the upper link plate web has a greater width than the lower link plate web, resulting in a non-uniform tensile force distribution; the upper link plate web absorbs a significantly greater tensile force than the lower link plate web.

Furthermore, the configuration of the opening with a plurality of concave or convex curve segments has the result that said opening can be produced only with difficulty. Such cover link plates are usually produced by means of a punching tool; on account of the complex configuration of the opening, bending of the edge regions of the opening and/or distortion of the link plates occurs as the inner opening is punched out.

A similar problem is also encountered with the cover link plate known from U.S. Pat. No. 6,171,209, which has a bone-shaped opening and which can likewise be produced only with difficulty on account of the alternating convex and concave curve segments.

Finally, U.S. Pat. No. 5,176,586 has disclosed a cover link plate whose opening between the cradle piece openings has an elongate oval configuration and in which the upper link plate web is formed so as to be significantly wider than the lower link plate web, that is to say there is again a non-uniform tensile force distribution with the result that the stress-critical points of the cradle piece openings are again subjected to non-uniform loading, and there is the risk of cracks forming proceeding from the contact zone between the cradle piece and the cradle piece opening.

The known cover link plates thus have the problem that, on account of their rigidity, they lead to non-uniform stress distributions in the toothed chain.

SUMMARY OF THE INVENTION

Taking this as a starting point, the object on which the present invention is based is that of providing a toothed chain which has cover link plates and which leads to a more uniform stress distribution in the region of the stress-critical points than is obtained in toothed chains having the known cover link plates.

The invention provides a toothed chain, in particular for a vehicle drive, having a multiplicity of toothed link plates and cover link plates articulatedly connected to one another by means of cradle pieces, the cradle pieces running substantially transversely with respect to the longitudinal direction of the toothed chain and being arranged in cradle piece openings of the toothed link plates and cover link plates, and the cover link plates forming guide link plates which are situated at the outside at both sides of the longitudinal direction of the toothed chain and which hold between them the toothed link plates, and said cover link plates being formed with link plate hoops which have a respective opening for the cradle pieces and with an upper link plate web and a lower link plate web which connect the link plate hoops, and an opening being formed in the region between the upper and lower link plate webs, wherein the opening has a shape which is substantially trapezoidal in plan view and which has sides of substantially equal length in a height direction of the opening and which has a top side and an underside of different lengths in a width direction of the opening, and the longer top side is assigned to the upper link plate web and the shorter underside is assigned to the lower link plate web.

The invention is thus characterized in that the special shape of the opening in conjunction with the upper and lower link plate webs generates between the mutually adjacently arranged joints of the toothed chain a force flow which leads to a significantly more uniform stress distribution between the upper and lower stress-critical points in the contact zones of the cradle pieces with the cradle piece openings than is obtained in the known toothed chains with the known, above-described cover link plates.

Those sides of the trapezoidal recess or opening of the cover link plate which are assigned to the respective cradle piece openings are in each case of substantially equal length; the top side which is assigned to the upper link plate web is longer than the underside, which is assigned to the lower link plate web, of the opening. It has been found that said trapezoidal shape of the opening leads to a surprisingly good substantially uniform distribution of the compressive stresses in the region of the upper and lower contact zone of the cradle piece with the cradle piece openings of the cover link plate. Said substantially uniform distribution then in turn ensures that, in loading situations, no one point of the contact zones is at a greater risk of cracking than adjacent points of the contact zone, and therefore the probability of failure of the toothed chain has been reduced and therefore the service life of the toothed chain according to the invention has been lengthened.

In one refinement of the invention, the top side of the opening is formed so as to be concavely curved toward the upper link plate web proceeding from the opening, and the underside is likewise formed so as to be concavely curved toward the lower link plate web proceeding from the opening. Said configuration serves to reduce the width of the upper and lower link plate webs, and therefore to reduce the rigidity of the cover link plate, and therefore in turn to prevent the cover link plates from undesirably absorbing a considerably greater tensile force than the toothed link plates arranged within the cover link plates, and therefore the risk of damage to the cover link plates in the region of the stress-critical points of the contact zones is reduced.

In one refinement of the invention, the two sides of the opening are of substantially rectilinear design and have in each case concavely formed upper and lower connecting regions, as viewed in the outward direction proceeding from the opening, between them and the top side and the underside. Said configuration has the result that no stress concentration occurs at corner regions of the opening, which in turn would promote the risk of crack formation.

In one refinement of the invention, the opening of the cover link plates is formed such that the upper link plate web has a smallest width A as viewed in the height direction of the opening and the lower link plate web has a maximum width C as viewed in the height direction of the opening, and the ratio A/C has a value in the range from approximately 0.2 to approximately 0.4 and in particular of 0.3. It has been found that, with the cover link plate according to the invention having these value ratios, a balanced stress distribution can be attained in the region of the critical contact zones between the cradle pieces and the cradle piece openings.

In one refinement of the invention, the cradle piece openings, at their regions situated at the top and bottom in the height direction of the opening and facing toward the opening, have in each case a concave recess which is directed outwardly and toward the opening and which has a first radius of curvature, and in the region between the recess, are formed so as to be concavely curved with a second radius of curvature in the direction of the opening, the first radius of curvature being smaller than the second radius of curvature. Said configuration of the cradle piece openings with the recesses has the effect that, as the toothed chain circulates around the sprockets, the cradle pieces have a deflection space, and no undesirable stress build-up with locally high stress peaks occurs between the cradle pieces and the cradle piece openings.

It is also provided in one refinement of the invention that in each case one connecting web which connects the upper link plate web and the lower link plate web is formed between the cradle piece openings and the opening, that side region of which connecting web which is directed toward the opening encloses an angle $\alpha$ with the height direction of the opening, which angle $\alpha$ has a value in the range from approximately 8 degrees to approximately 12 degrees and in particular of approximately 10 degrees. Said angle range has likewise proven to be advantageous for preventing the formation of local stress peaks and for providing a balanced stress distribution in the region of the connecting web and the cradle piece openings. Here, the connecting web has a substantially constant width in the region between the upper link plate web and the lower link plate web, such that said connecting web, along its longitudinal extent as viewed in the height direction of the opening between the upper link plate web and the lower link plate web, undergoes a change in width of only approximately 20 percent.

Assuming that the connecting web has a width $B_1$ in the region of the upper recess of the cradle piece opening in the upper connecting region between the first and second radii of curvature of the cradle piece opening and of the facing side of the opening, and has a width $B_2$ in the region of the lower recess in the lower transition region between the first and second radii of curvature of the cradle piece opening and of the facing side of the opening, the ratio $B_1/B_2$ should be within a value range from approximately 0.8 to approximately 1.2 and in particular of 0.9. Said value range, too, has proven to be advantageous with regard to obtaining a balanced stress distribution in the region of the critical contact zones.

The cradle piece openings thus each have an upper and lower transition region between the in each case first and second radii of curvature. In one refinement of the invention, it is provided that the opening, as viewed in the width direction of the opening, has a width $F_1$ between the two upper transition regions of the two cradle piece openings and has a width $F_2$ in the region between the two lower transition regions, and the ratio $F_1/F_2$ has a value in the range from approximately 1.0 to approximately 1.3, and in particular of 1.19.

Furthermore, it has proven to be advantageous for the height D of the opening as viewed in the height direction of the opening to have a value which approximately corresponds to 0.6 times the pitch P of the toothed chain. Furthermore, the opening, as viewed in the height direction, has a distance E between the upper and lower abovementioned transition regions, and according to the invention, the ratio E/D has a value in the range from approximately 0.1 to approximately 1.0, with a value of 0.567 having proven to be particularly advantageous.

Finally, in one refinement of the invention, it is also provided that the opening and the cradle piece openings are connected to additional openings which connect said respective openings, so as to form an integral opening which is determined substantially by the contour of the cradle piece openings and the openings, which is advantageous in particular with regard to production with a single-piece punching die.

BRIEF DESCRIPTION OF THE DRAWINGS

The invention will be explained in more detail below on the basis of the drawing, in which:

FIG. 6 shows an illustration similar to FIG. 5, with further labels for explaining the geometric relationships.

DETAILED DESCRIPTION OF THE INVENTION

Figure 1:
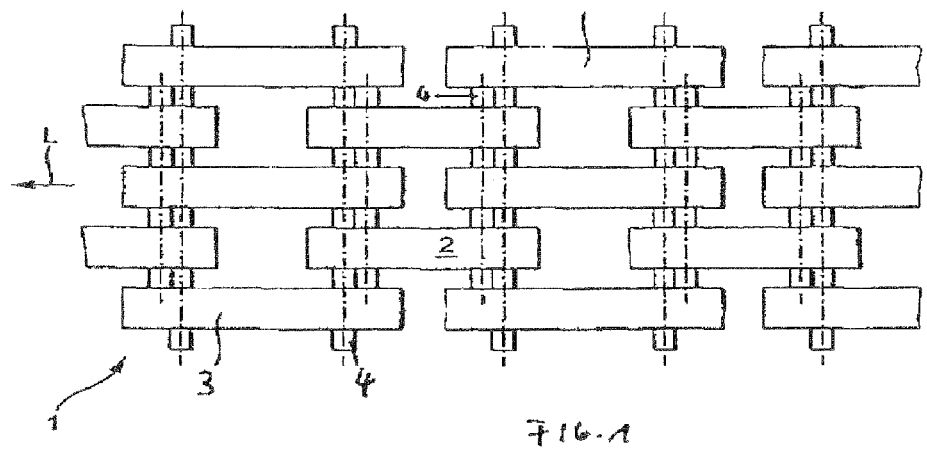
FIG. 1 shows a plan view of a toothed chain as per an embodiment according to the present invention, with toothed link plates and with cover link plates arranged at the outside at both sides of the longitudinal direction of the toothed chain.

FIG. 1 of the drawing shows, in a view from above, a toothed chain 1 having a multiplicity of inner toothed link plates 2 arranged offset with respect to one another, and having cover link plates or guide link plates 3 arranged in the longitudinal direction L at both sides of the toothed chain 1. The toothed link plates 2 and the cover link plates 3 are articulatedly connected to one another in each case by means of cradle pieces 4 arranged substantially transversely with respect to the longitudinal direction of the toothed chain 1.

Figure 2:
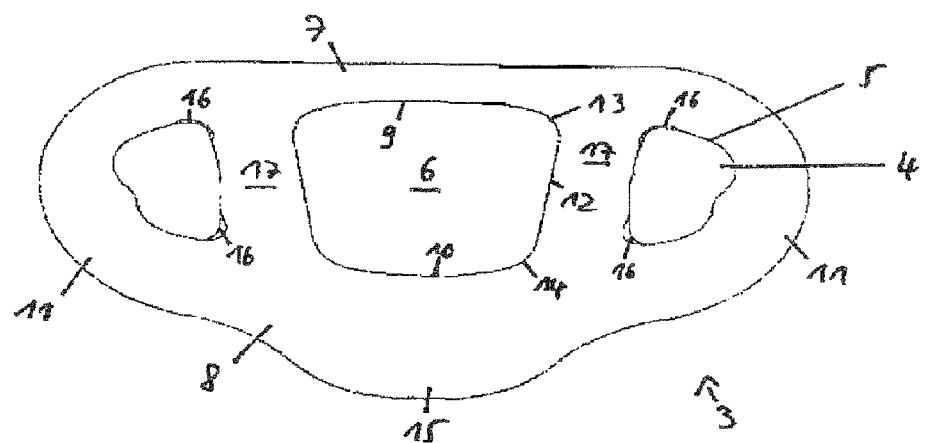
FIG. 2 shows a view of a cover link plate of a toothed chain according to the present invention.

The design of the cover link plates 3 is shown in more detail in FIG. 2.

The cover link plates 3 have cradle piece openings 5 in which the cradle pieces 4 already mentioned above are arranged. An opening 6 is arranged between the two cradle piece openings 5 which are arranged one behind the other in the longitudinal direction L of the toothed chain 1, which opening 6 is of trapezoidal design in the side view of the cover link plate 3 (if the link plate 3 lies on a flat surface, then the illustration also corresponds to a plan view of the cover link plate 3).

Here, the opening 6 has a top side 9 assigned to an upper link plate web 7 and has an underside 10 assigned to a lower link plate web 8. The upper link plate web 7 and the lower link plate web 8 are connected by two link plate hoops 11 in which the cradle piece openings 5 are formed. The top side 9 and the underside 10 are adjoined in each case by connecting regions which connect the top side 9 and the underside 10 to rectilinear sides 12 of the opening 6.

Here, the upper connecting regions 13 connect the top side 9 to the sides 12, and the lower connecting regions 14 connect the underside 10 to the sides 12, and as viewed from the opening 6, the connecting regions 13, 14 are concavely curved in the outward direction.

A run-in web 15 prevents lateral slippage of the toothed chain 1 as it circulates around sprockets (not illustrated in any more detail). The cradle piece openings 5 each have, at their sides facing toward the upper link plate web 7 and the lower link plate web 8, recesses 16 which are concavely curved in the direction of the opening 6 and of the link plate webs 7, 8.

In each case one connecting web 17 is formed between the cradle piece openings 5 and the opening 6, one side of which connecting web 17 in the lateral direction is delimited by the side 12 of the opening 6 and the other side of which connecting web 17 in the lateral direction is delimited by the cradle piece opening 5.

Figure 3:
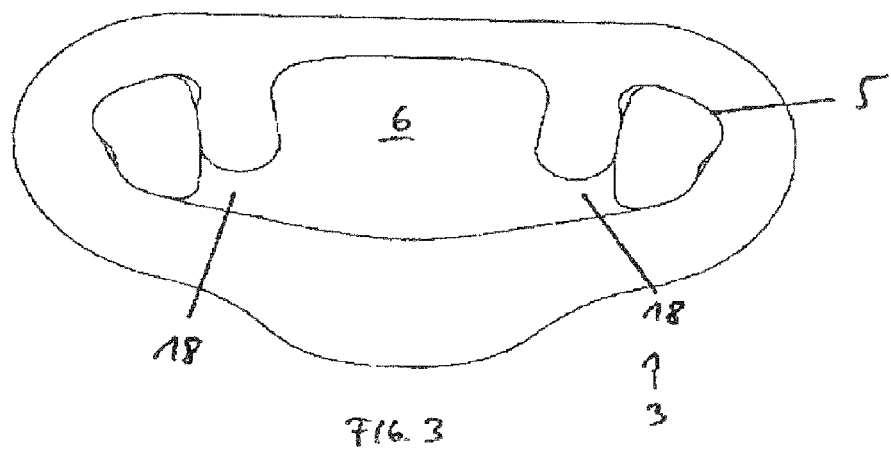
FIG. 3 shows a view similar to that in FIG. 2, but showing a modified cover link plate.

FIG. 3 of the drawing shows a modified embodiment of a cover link plate 3, which differs from the cover link plate 3 illustrated in FIG. 2 substantially in that, in addition to the opening 6 and the cradle piece openings 5, there are provided two further openings 18 which connect said openings, such that a continuous opening is formed whose main opening is however, like before, the trapezoidal opening 6. The continuous opening has the advantage that, during production, only a single die is required for the punching process. In the further illustration, more detail will be given regarding the cover link plate 3 illustrated in FIG. 2, in order to describe the geometric relationships in particular of the opening 6 and of the connecting web 17.

Figure 4:
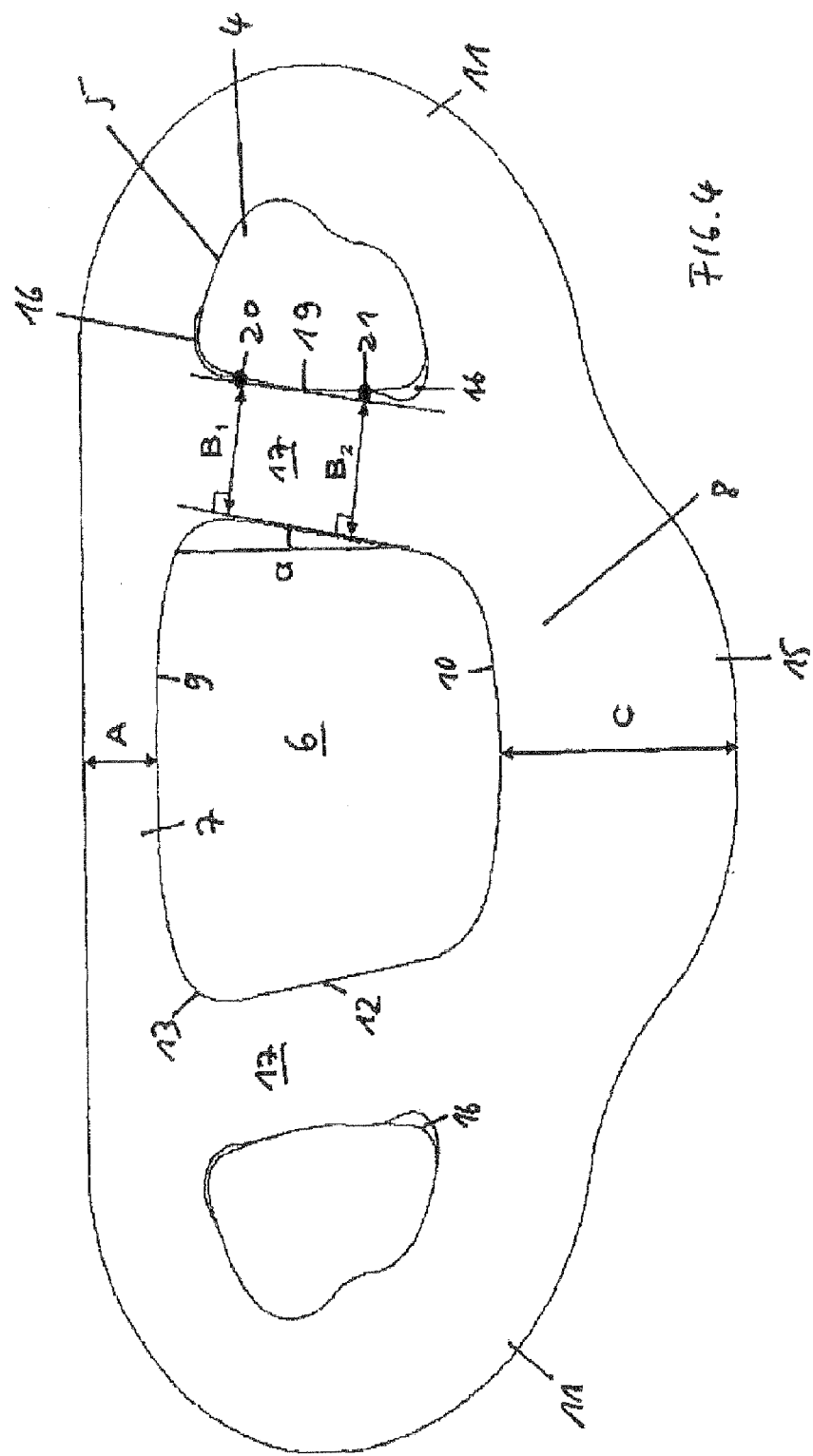
FIG. 4 shows an enlarged illustration of the cover link plate as per FIG. 2, with labels for explaining the geometric relationships.

As can be seen from the enlarged illustration of FIG. 4, the cradle piece opening 5, proceeding from the cradle piece opening 5, has the recess 16 which is formed concavely with a first radius of curvature, and said cradle piece opening 5 is likewise formed concavely in the direction of the opening 6 with a second radius of curvature, specifically in the region of the reference symbol 19. Here, the first radius of curvature is significantly smaller than the second radius of curvature. The transition region from the first radius of curvature to the second radius of curvature and back to the first radius of curvature indicates in each case a transition region 20 and a transition region 21 respectively, at which high compressive stresses occur during the rolling of the cradle pieces 4.

As can be seen from FIG. 4, the connecting web 17 is inclined by an angle $\alpha$ of approximately 10 degrees relative to the height direction of the opening 6. The connecting web 17 has a width $B_1$ at the upper transition region 20 and has a width $B_2$ at the lower transition region 21. In the embodiment illustrated, the ratio $B_1/B_2$ of the width $B_1$ to the width $B_2$ is approximately 0.9.

The upper link plate web 7 has a width A transversely with respect to the longitudinal direction and the lower link plate web 8 has a width C. In the illustrated embodiment, the ratio A/C is approximately 0.3.

Figure 5:
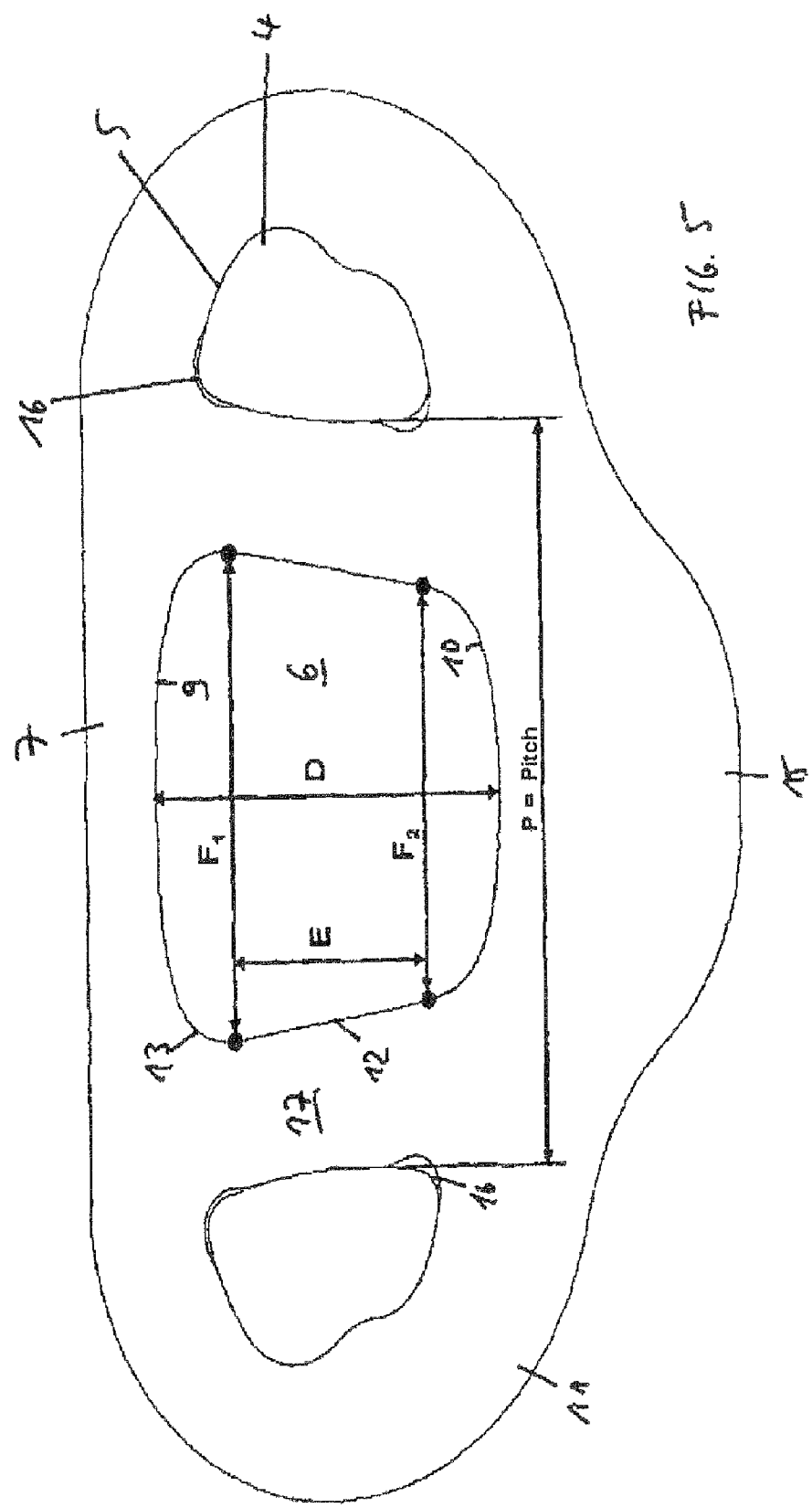
FIG. 5 shows an illustration similar to FIG. 4, with further labels for explaining the geometric relationships.

FIG. 5 of the drawing shows the opening 6 with further labels for explaining the geometric relationships. As is readily apparent from FIG. 5, the opening 6, as viewed in the width direction of the opening, has a width $F_1$ between the upper transition regions 20 of the cradle piece opening 5, and has a width $F_2$ slightly below the lower transition region 21. In the illustrated embodiment of the cover link plate 3, the ratio $F_1/F_2$ has the value 1.19. Proceeding from the measurement height for the width $F_1$, the width $F_2$ is determined a distance E below the measurement height for the width $F_1$. The opening 6, as viewed in the height direction, has a height D, and in the illustrated embodiment, the ratio E/D between the distance E and the height D is 0.567. Here, the height D corresponds approximately to 0.6 P, wherein P represents the pitch of the toothed chain 1.

The opening 6 can be paraphrased as a trapezoid 22 shown in more detail on the basis of FIG. 5. A line $G_1$ is applied to the top side 9 and a line $G_2$ is applied to the underside 10. The distance between said two lines corresponds to the height D already mentioned above. The length of said two lines in each case to the point of intersection with lines 23 applied to the two sides 12 is measured. In the illustrated embodiment, the ratio $G_1/G_2$ is approximately 1.38, wherein values of said ratio from approximately 1 to approximately 1.5 have proven to be advantageous.

The cover link plate 3 has a total height H. In the illustrated embodiment, the ratio D/H of the height D of the opening 6 to the total height H of the cover link plate 3 is approximately 0.52, wherein values in the range from 0.3 to 0.8 have proven to be advantageous.

If a central line 24 is drawn between the two parallel sides of the trapezoid 22, then said central line 24 is at a distance J from the central line 25 of the entire cover link plate 3 (corresponds to the parting plane, specifically the connection of the joint contact points in the straight chain strand). Said distance J amounts to approximately 2 to approximately 5 percent of the pitch P.

The toothed chain according to the invention is characterized in that it has a more uniform force distribution between the toothed link plates and the cover link plates, because the cover link plates are characterized by a targeted manipulation of their rigidity. The opening of the cover link plate has a trapezoidal configuration and leads to a balanced stress distribution at the stress-critical points.

The configuration of the toothed chain according to the invention with the cover link plates described in more detail leads to a material saving and therefore to a weight saving of the toothed chain in relation to known toothed chains. The connecting web has a substantially constant width, as a result of which the cradle pieces are pressed homogeneously into the cradle piece openings. Furthermore, an improved supply of oil to the cover link plates situated at the inside and to the cradle thrust pieces can be attained via the opening, as a result of which the wear of the toothed chain according to the invention can be reduced, and therefore the service life of the toothed chain can be increased.

With regard to those features of the invention which have not been explained in any more detail above, reference is otherwise made to the claims and to the drawings.

LIST OF REFERENCE SYMBOLS

1 Toothed chain
2 Toothed link plate
3 Cover link plate
4 Cradle piece
5 Cradle piece opening
6 Opening
7 Upper link plate web
8 Lower link plate web
9 Top side
10 Underside
11 Link plate hoop
12 Side
13 Upper connecting region
14 Lower connecting region
15 Run-in web
16 Recess
17 Connecting web
18 Opening
19 Region
20 Transition region
21 Transition region
22 Trapezoid
23 Line
24 Trapezoid central line
25 Cover link plate central line
L Longitudinal direction
A Width
C Width
$B_1$ Width
$B_2$ Width
D Height
$F_1$ Width
$F_2$ Width
$G_1$ Line
$G_2$ Line
J Distance
α Angle

The invention claimed is:

1. A toothed chain for a vehicle drive, comprising:
cradle pieces running substantially transversely with respect to a longitudinal direction of the toothed chain;
a multiplicity of toothed link plates having cradle piece openings; and
cover link plates having cradle piece openings, an upper link plate web, a lower link plate web, an opening formed between the upper link plate web and the lower link plate web, and link plate hoops which have the cradle piece openings, the upper link plate web and the lower link plate web connecting the link plate hoops, the cover link plates being articulatedly connected to one another by the cradle pieces, which are arranged in the cradle piece openings of the toothed link plates and the cover link plates, and the cover link plates forming guide link plates, which are situated at an outside, at both sides of the longitudinal direction of the toothed chain with the toothed link plates being held between the guide link plates,
wherein the opening of the cover link plates has a shape which is substantially trapezoidal in plan view with sides of substantially equal length in a height direction of the opening of the cover link plates and a top side and an underside of different lengths in a width direction of the opening of the cover link plates with the top side being longer than the bottom side and with the top side assigned to the upper link plate web and the underside assigned to the lower link plate web, and
wherein the upper link plate web has a smallest width in the height direction of the opening of the cover link plates and the lower link plate web has a greatest width in the height direction of the opening of the cover link plates, and a ratio of the smallest width in the height direction of the upper link plate and the greatest width in the height direction of the lower link plate has a value in a range of approximately 0.2 to approximately 0.4.

2. The toothed chain as claimed in claim 1, wherein the top side is concavely curved toward the upper link plate web proceeding from the opening, and the underside is concavely curved toward the lower link plate web proceeding from the opening.

3. The toothed chain as claimed in claim 1, further comprising concavely formed upper and lower connecting regions between the sides, the top side and the underside of the opening, and the sides of the opening in the height direction of the opening being substantially rectilinear.

4. The toothed chain as claimed in claim 1, wherein the ratio of the smallest width in the height direction of the upper link plate and the greatest width in the height direction of the lower link plate is approximately 0.4.

5. The toothed chain as claimed in claim 3, wherein the opening of the cover link plates has concave recesses formed in the upper and lower connecting regions between the top side, the underside and one of the sides of the opening of the cover link plates, the concave recesses are directed outwardly and toward the opening of the cover link plates and have a first radius of curvature, and in a region between the recesses, are formed so as to be concavely curved with a second radius of curvature in the direction of the opening of the cover link plates, and the first radius of curvature is smaller than the second radius of curvature.

6. The toothed chain as claimed in claim 1, further comprising a connecting web, which connects the upper link plate web and the lower link plate web, formed between the cradle piece openings and the opening of the cover link plates, the connecting web has a side region directed toward the opening of the cover link plates which forms an angle with the height direction of the opening of the cover link plates, the angle has a value in a range of approximately 8 degrees to approximately 12 degrees.

7. The toothed chain as claimed in claim 6, wherein the angle is approximately 10 degrees.

8. The toothed chain as claimed in claim 6, wherein the opening of the cover link plates has upper transition regions located between the top side and the sides of the opening of the cover link plates and lower transition regions located between the underside and the sides of the opening of the cover link plates, wherein the connecting web has an upper recess formed between the top side and the one of the sidewalls, which faces the opening of the cover link plates and a lower recess formed between the bottom side and the one of the sidewalls, which faces the opening of the cover link plates, and wherein the connecting web has a first width in a region between the upper recess of the cradle piece opening and the upper transition region of the opening of the cover link plates and a second width in a region between the lower recess and the lower transition region of the opening of the cover link plates, a ratio of the first width of the connecting region to the second width of the connecting region has a value in a range from approximately 0.8 to approximately 1.2.

9. The toothed chain as claimed in claim 8, wherein the ratio of the first width of the connecting region to the second width of the connecting region has value of 0.9.

10. The toothed chain as claimed in claim 6, wherein the opening of the cover link plates has upper transition regions located between the top side and the sides of the opening of the cover link plates and lower transition regions located between the underside and the sides of the opening of the cover link plates, the opening of the cover link plates, as viewed in the width direction of the opening, has a width between the upper transition regions and a width between the lower transition regions, a ratio of the upper transition regions to the lower transition regions has a value in a range from approximately 1.0 to approximately 1.3.

11. The toothed chain as claimed in claim 10, wherein the ratio of the upper transition regions to the lower transition regions has a value of 1.19.

12. The toothed chain as claimed in claim 1, wherein the opening of the cover link plates has upper transition regions located between the top side and the sides of the opening of the cover link plates and lower transition regions located between the underside and the sides of the opening of the cover link plates and the toothed chain has a pitch, and the opening of the cover link plates as viewed in the height direction of the opening of the cover link plates, has a height which corresponds approximately to 0.6 times the pitch of the toothed chain.

13. The toothed chain as claimed in claim 12, wherein the opening of the cover link plates, as viewed in the height direction of the opening of the cover link plates, has a distance between the upper transition regions and the lower transition regions, and a ratio of the distance between the upper transition regions and the lower transition regions to the height of the opening of the cover link plates has a value in the range from approximately 0.1 to approximately 1.0.

14. The toothed chain as claimed in claim 13, wherein the ratio of the distance between the upper transition regions and the lower transition regions to the height of the opening of the cover link plates has a value of 0.567.

* * * * *